United States Patent
Kim et al.

(10) Patent No.: US 10,885,385 B2
(45) Date of Patent: Jan. 5, 2021

(54) IMAGE SEARCH AND TRAINING SYSTEM (71) Applicant: SAP SE, Walldorf (DE)

(72) Inventors: Sohyeong Kim, Berlin (DE); Eduardo Vellasques, Berlin (DE); Urko Sanchez Sanz, Berlin (DE)

(73) Assignee: SAP SE, Walldorf (DE)

( * ) Notice: Subject to any disclaimer, the term of this patent is extended or adjusted under 35 U.S.C. 154(b) by 36 days.

(21) Appl. No.: 16/357,720

(22) Filed: Mar. 19, 2019

(65) Prior Publication Data
US 2020/0302229 A1  Sep. 24, 2020

(51) Int. Cl.
G06K 9/00 (2006.01)
G06K 9/62 (2006.01)
G06F 16/532 (2019.01)
G06F 16/56 (2019.01)
G06N 3/08 (2006.01)

(52) U.S. Cl.
CPC ......... *G06K 9/6256* (2013.01); *G06F 16/532* (2019.01); *G06F 16/56* (2019.01); *G06K 9/6215* (2013.01); *G06N 3/08* (2013.01)

(58) Field of Classification Search
CPC .. G06K 9/6256; G06K 9/6215; G06F 16/532; G06F 16/56; G06N 3/08
See application file for complete search history.

(56) References Cited

U.S. PATENT DOCUMENTS

| | | | |
|---|---|---|---|
| 8,131,786 B1 * | 3/2012 | Bengio | G06K 9/66 707/748 |
| 8,965,891 B1 | 2/2015 | Bengio et al. | |
| 10,043,109 B1 | 8/2018 | Du et al. | |
| 10,592,732 B1 * | 3/2020 | Sather | G06K 9/00261 |
| 2018/0053042 A1 * | 2/2018 | Philbin | G06K 9/00288 |
| 2019/0354802 A1 * | 11/2019 | Lin | G06K 9/4628 |
| 2020/0074247 A1 * | 3/2020 | Dubovsky | G06K 9/627 |
| 2020/0226421 A1 * | 7/2020 | Almazan | G06K 9/6256 |

OTHER PUBLICATIONS

Dauphin. Y.N. et al., "Language Modeling with Gated Convolutional Networks," *Proceedings of the 34th International Conference on Machine Learning*, Sydney, Australia, PMLR 70, 2017, 9 pages.

(Continued)

*Primary Examiner* — David F Dunphy
(74) *Attorney, Agent, or Firm* — Sterne, Kessler, Goldstein & Fox P.L.L.C.

(57) ABSTRACT

Disclosed herein are system, method, and computer program product embodiments for providing an image search training system. An embodiment operates by determining a query image on which to train an image search system, and a positive image visually similar to the query image. A set of negative images from a plurality of negative images visually dissimilar to the query image are selected, where the selected set of negative images includes both a first negative image and a second negative image. A first similarity measure between the first negative image and the positive image, and a second similarity measure between the second negative image and the positive image are calculated. The first negative image is selected based on the first similarity measure being less than the second similarity measure. The query image, the positive image, and the first negative image are provided to the image search system for training.

20 Claims, 4 Drawing Sheets (56) References Cited

OTHER PUBLICATIONS

Gajić, B. & Baldrich, R., "Cross-domain fashion image retrieval," *2018 IEEE/CVF Conference on Computer Vision and Pattern Recognition Workshops (CVPRW)*, Jun. 18-22, 2018, pp. 1982-1984.
Gordo, A. et al., "End-to-end Learning of Deep Visual Representations for Image Retrieval," available at https://arxiv.org/pdf/1610.07940v2.pdf, May 5, 2017, 19 pages.
Hermans, A. et al., "In Defense of the Triplet Loss for Person Re-Identification," available at https://arxiv.org/pdf/1703.07737.pdf, Nov. 21, 2017, 17 pages.
Merity, S. et al., "An Analysis of Neural Language Modeling at Multiple Scales," available at https://arxiv.org/pdf/1803.08240.pdf, Mar. 22, 2018, 10 pages.
Peters, M.E, et al., "Deep contextualized word representations," *Proceedings of NAACL-HLT 2018*, New Orleans, Louisiana, Jun. 1-6, 2018, pp. 2227-2237.
Radford, A. et al., "Improving Language Understanding by Generative Pre-Training," available at https://s3-us-west-2.amazonaws.com/openai-assets/research-covers/language-unsupervised/language_understanding_paper.pdf, 2018, 12 pages.
See, A. et al., "Get to the Point: Summarization with Pointer-Generator Networks," available at https://arxiv.org/pdf/1704.04368.pdf , Apr. 25, 2017, 20 pages.
Wang, J. et al., "Learning Fine-grained Image Similarity with Deep Ranking," available at https://arxiv.org/pdf/1404.4661.pdf, Apr. 17, 2014, 8 pages.
Extended European Search Report, dated May 4, 2020, for European Patent Appl. No. 19205340.3, 8 pages.

* cited by examiner

IMAGE SEARCH AND TRAINING SYSTEM

Generally, an image search system returns images in response to user queries. Integral to the success of an image search system is the ability for the system to differentiate between different images that may have some overlapping and/or similar visual characteristics. In order to make these differentiations, an image search system may need to be trained appropriately. However, most such image search system training often consumes substantial computing cycles, requires substantial time to operate, and may still prove to be ineffective at differentiating between images that include similar features.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing image search and training system training.

Figure 1:
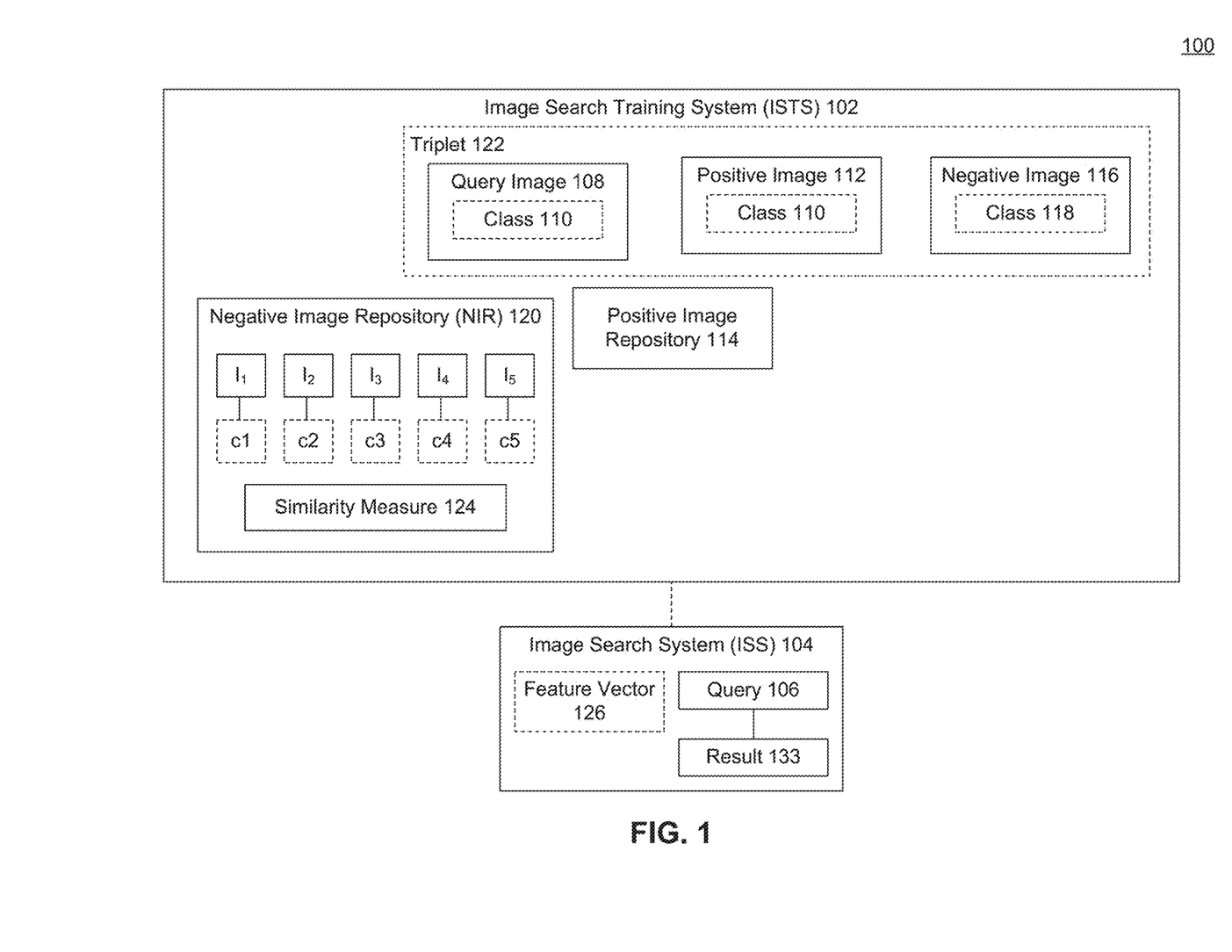
FIG. 1 is a block diagram illustrating example functionality for providing an image search training system (ISTS), according to some embodiments.

FIG. 1 is a block diagram 100 illustrating example functionality for providing an image search training system (ISTS) 102, according to some embodiments. Image search systems (ISS) 104 may be used to perform image searches on queries 106.

Image searches may include text-based searches in which a user enters a text-search string such as "apple", or image-based searches in which a user provides an image-based search such as a picture of an apple. ISS 104 may then return results 107 (such as images of one or more apples) that are relevant or similar to the query 106.

While image search systems 104 may determine differences between two different types of objects at a high level, such as differentiating between an apple and a car, search system have greater difficulties as the image becomes more. similar or fine-grained, such as differentiating between different types of apples or an apple and a plum. The predictive capability of these systems often decreases when the images are visually similar, and the system performance and accuracy of the results 107 decreases.

To maintain search accuracy when executing increasingly fine-grained queries 106 or images, image search systems 104 need to be better trained. Training an ISS 104 may include providing a set of images to the ISS 104 with an indication as to which images are similar and/or dissimilar. However, better training usually requires more training images, which in turn requires more computing cycles, memory, and computing time that are taken away from the other functions of a training system, as well as delaying the production capabilities of actually using ISS 104 to execute query searches 106 and produce results 107. Furthermore, even if more computing resources and time are invested in training search systems, there is no guarantee that the accuracy of results 107 will improve for fine-grained searches. To improve the accuracy of results 107, the actual process for training these search systems (e.g., ISS 104) may need improvement.

ISTS 102 improves training processes for training an ISS 104 by requiring both fewer computing resources (e.g., computing cycles, memory, time, et.) for conducting the training, and improving the quality of results 107 produced by an ISTS 102 trained ISS 104, particularly with regard to performing fine-grained searches on images.

A coarse-grained or high level query 106 may be a general or categorical image search. Example coarse-grained searches may include searches for "apples", "flowers", or "cars." To provide results 107 for a high level query 106 such as "cars", ISS 104 may simply differentiate images of cars against images of non-cars (which may include images of trees, boats, flowers, fruits, faces of people, etc.).

A medium-grained search or query 106 may include greater details and may cause an image search system 104 to differentiate between objects that may fall within the same category. For example, a medium grained search may cause ISS 104 to differentiate between images of "compact cars" and images of "sedans." Performing such a search may generally require greater processing by a search system and produce less accurate or reliable results 107 relative to the coarse-grained search results. Because now, for example, the search system may be required to differentiate amongst different types of cars that have overlapping characteristics, such as wheels, doors, windshields, etc.

A fine-grained search or query 106 may include even greater details relative to a medium-grained search or query 106 and may cause ISS 106 to differentiate between very similar images with overlapping characteristics or visual features. Example fine grained searches may cause ISS 104 to be required to differentiate between two diamond rings with slightly different settings or carats, or between a 1996 Toyota Camry and a 1997 Toyota Camry. While images may appear almost identical, there are nonetheless visual differences which insufficiently trained image search systems cannot detect. ISTS 102 may improve the ability of image search systems 104 to make such differentiations with less training time and resources than may otherwise be required.

Some search systems may rely on metadata, such as extensive labels, that provide details about the images in order to perform image searches. However, rather than evaluating the images themselves, these search systems may perform text searches on the metadata or labels to identify appropriate images or results. However, applying or verifying the accuracy of these metadata or labels is often a manual, resource intensive, and time consuming process. These search systems are then often limited by the accuracy and details of such labels, and thus are not truly image search systems—but instead simply employ text-based searching on metadata while returning image results.

ISTS 102 may train ISS 104 to make fine-grained differentiations on images without requiring metadata or labels identifying the object(s) of an image. In an embodiment, labels and other metadata may be relied upon by an ISTS trained ISS 104 for searching or verification purposes if the metadata exists on the images of a database being searched, however there is no requirement that images used to train ISS 104 include metadata that identifies the objects of the images. Without image metadata ISTS 102 may still train ISS 104 to execute queries 106 and produce fine-grained differentiated results 107.

ISTS 102 may receive a selection of, or select a query image 108 from a database or repository of images. Query image 108 may be a training image of what image or object ISS 104 is being trained to identify, classify, search, or differentiate from other images. For example, ISTS 102 may train ISS 104 to identify a particular apple, in which case query image 108 may be an image of the particular apple. In an embodiment, query image 108 may include metadata or a classification (class) 110 of generally being labeled a fruit and/or an apple. In an embodiment, the class 110 may include more information about the color, type, ripeness, farm on which the apple was grown, or other information.

Based on query image 108, ISTS 102 may receive a selection of or select a positive image 112 from positive image repository 114. Positive image 112 may be an image that is relevant, visually similar to, or include the same classification 110 as query image 108. For example, positive image 112 may include a different image of the same apple or a different apple.

In an embodiment, ISTS 102 may select positive image 112 from a positive image repository 114. Positive image repository 114 may include a selection of different images of the same or similar object being depicted in or classified by query image 108. The images of positive image repository 114 may include the same class 110 as query image 108.

ISTS 102 may also select a negative image 116. Negative image 116 may include any image that is different from (e.g., includes a different classification 118 relative to the classification 110 of) query image 108. Negative image 116 may be selected from a negative image repository 120.

In an embodiment, query image 108, positive image 112, and negative image 116 may be assembled or combined into a triplet 122. ISTS 102 may provide one or more triplets 122 to ISS 104 for training purposes. From triplet 122, ISS 104 may have a root, core or base query image 108, and may identify both similarities between query image 108 and positive image 112, and differences between query image 108 and negative image 116. Relative to an apple query image 108, example positive image images 112 may include other apples, while examples of negative images 116 selected by ISTS 102 may include other fruit (such as plums or pineapples), apple trees, other objects that are a similar shape of an apple such as a baseball or the same color of an apple such as a ruby.

Class 110, 118 may include metadata that identifies the object or main object(s) of a particular image 108, 112, 116. However, in another embodiment, class 110, 118 may be a binary flag indicating a similarity or difference from query image 108, or may indicate whether the image 112, 116 is from positive image repository 114 or NIR 120.

For example, query image 108 may not include a class 110, or may include the binary class of "1". Then, for example, class 110 of positive image 112 may be a binary flag set to "1" indicating it is the same category or a similar image to query image 108, or may include the same value as class 110 of query image 108. Class 118 of negative image 116 may then be set to a different value than class 110 of query image 108, or may be a binary flag set to "0" to indicate it is false or not the same or similar to query image 108.

In an embodiment, ISTS 102 may train neural network and machine learning technology of ISS 104. For example, based triplet 122, ISS 104 may learn what are the visual characteristics of positive image 112 that are similar and/or different from to query image 108, and what are the visual characteristics of negative image 116 that are different and/or similar to query image 108.

Each triplet 122 provided to ISS 104 may cause another round of learning or refining, which may both require greater computing resources but which may also improve the predictive capabilities of ISS 104 in identifying query image 108 or similar images as results 107. As such, the goal is to train ISS 104 to the greatest predictive capabilities with the least amount of computing cycles consumed in training with different triplets 122.

In an embodiment, a neural network, such as ISS 104, may learn or be trained to minimize an image similarity loss function (e.g., increase its predictive capability). For example, the triplet 122 may be provided with relative similarity between the objects of images 108, 112, and 116. Query image 108 may be a base object, and positive image 112 may be a similar object to be categorized, grouped, or classified as a valid result 107 for a search for query image 108. And negative image 116 may be a different or dissimilar object (relative to positive image 112) to be categorized, grouped, or classified to be excluded from the results 107 for a search for query image 108.

In an embodiment, a goal of ISS 104 may be to learn a function F such that for any new triplet of objects 122 (q, q+, q−), F(q, q+)>F(q, q−). The result should be that the function returns a value for q+ that is more similar than the function return for q−. The larger the gap, the greater predictive capability the ISS 104 may have. In an embodiment, the output of the function F may be a value between 0 and 1, where values closer to 0 may indicate dissimilar images and values closer to 1 indicate image similarity.

In an embodiment, ISS 104 may be trained on hinge loss which may be a function used to train classifiers, particularly for maximum-margin classification. In response to receiving triplet 122 (q, q+, q−), ISS 104 may output a corresponding feature vector 126 (f, f+, f−). The hinge loss function for the triplet 122 (q, q+, q−) may be L(f, f+, f−)=max {0, m+D(f, f+)−D(f, f−)}. D may be a distance function that determines the Euclidean distance or cosine similarity between the indicated images of triplet 122, and m may be a hyper-parameter used to impose a margin.

Once the predicative capability of ISS 104 reaches a particular predictive threshold, the training may cease and ISS 104 may be placed into production to process queries 106 and produce results 107. The resources being used to train ISS 104 may then be freed up and used for other applications or tasks including training another image search system, or training ISS 104 on a different query image 108 or class 110.

In an embodiment, ISTS 102 may strategically select negative images 116 from a negative image repository (NIR) 120 to expedite training of ISS 104 which may consume fewer resources in training ISS 104 and produce better results 107. As such, ISTS 102 may use fewer computing resources and shorten the training time through more efficiently assembling triplets 122. This may also increase the production time and throughput of ISS 104 in processing queries 106, and improve the quality of results 107 particularly with regard to fine-grained queries or results.

NIR 120 may include hundreds, thousands, or millions of images of different types, each of which may be have been previously determined to be dissimilar from query image 108 (e.g., of a different class 118). In an embodiment, NIR 120 may include images across different object type categories or classifications, or may be previously grouped to be dissimilar to query image 108. For example, query image 108 may be an image of an apple. In a cross-category example, NIR 120 may include images of buildings, boats, fruits (other than apples or including apples different from the apple of query image 108), people, logos, etc. In an embodiment, query image 108 may include a ripe red apple, and NIR 120 may include green apples, rotten red apples, apple seeds, or crab apples.

In an embodiment, ISTS 102 may calculate a similarity measure 124 between images or categories of images from NIR 120 and query image 108 or positive image 112. ISTS 102 may calculate similarity measure 124 by comparing the visual characteristics or attributes of images of NIR 102 against the visual characteristics or attributes of positive image 112. Example visual characteristics may include color, size, shading, lines, contours, dimensions, shapes, etc. Similarity measure 124 may indicate how similar two objects or images are.

Rather than computing a similarity measure on the images, sorting the images based on the similarity measure, and then selecting one of the images as negative images 116—a process which consumes many computing resources, especially as the number of images of NIR 120 increases—ISTS 102 strategically selects a subset images of NIR 120 to compute similarity measure 124—regardless of the size or number of images in NIR 120. Then, based on the similarity measure 124, ISTS 102 may select the most similar image from NIR 120 as negative image 116 of triplet 122.

This strategic approach reduces the computing cycles necessary to select a negative image 116 from NIR 120 because ISTS 102 does not compute a similarity measure on all the images of NIR 120, which can consume substantial computing cycles, memory, time, bandwidth, and other resources. Nor does ISTS 102 then sort the images based on the computed similarity measure, which would otherwise consume even greater computing resources.

In an embodiment, ISTS 102 may randomly select a subset of images of NIR 120. For example, NIR 120 may include millions of images, and ISTS 102 may randomly select 5 images (indicated as I1, I2, I3, I4, and I5), based on a random selection or diversity strategy (in which different categories or classes of images may be selected at least once). ISTS 102 may then compute a similarity measure 124 on each of the selected five images. In other embodiments, different numbers of images (other than five) may be selected from the NIR 120 database. ISTS 102 may then select the image (I1-I5) with the highest similarity measure 124 to use as negative image 116.

Selecting the image with the highest similarity measure 124 may enable ISTS 102 to more quickly train ISS 104 because it uses the most similar images (as negative images 116) which forces quicker learning by the machine learning technology of ISS 104. For example, rather than using an image of a banana that may be randomly selected as a negative image by other systems amongst the fruits, ISTS 102 may use an image of a plum (which is more visually similar to an apple and may include a higher similarity measure 124).

As discussed above, ISS 104 may need multiple iterations of training (e.g., with varying groups of triplets 122) in order to satisfy a predictive threshold for identifying query image 108. As such, ISTS 102 may repeat this process until the threshold is satisfied.

In an embodiment, the various selected images I1-I5 may each include a classification (c1, c2, c3, c4, c5). The classification may indicate an object type or category of image within NIR 120, for example if I2 is an image of a plum, then C2 may indicate plum. And if the image of plum I2 is more similar than the other images I1, I3, I4, and I5, then, in an embodiment, other images of plums (as determined by C2) may also be used as negative images 116 to continue training ISS 104.

In another embodiment, in selecting a second negative image 116 for a generating a second triple 122, the highest rated image category C2 may be maintained, and four new categories of images may be selected from NIR 120 for a second or subsequent iteration. ISTS 102 may calculate similarity measure 124 on the selected images of the newly selected image from C2 and the images of the four new categories (relative to positive image 112 which may be the same or different). Then, again, the image with the highest similarity measure 124 may be used as negative image 116. This may help further expedite the training process.

In an embodiment, once the predictive capability or similarity loss stops improving with additional iterations, or the number of training iterations has been satisfied, training may be concluded and ISS 104 may be placed into production to receive queries 106 and generate results 107. Then, for example, based on user feedback during production, ISS 104 may continue improving its predictive capabilities.

Figures 2A, 2B:
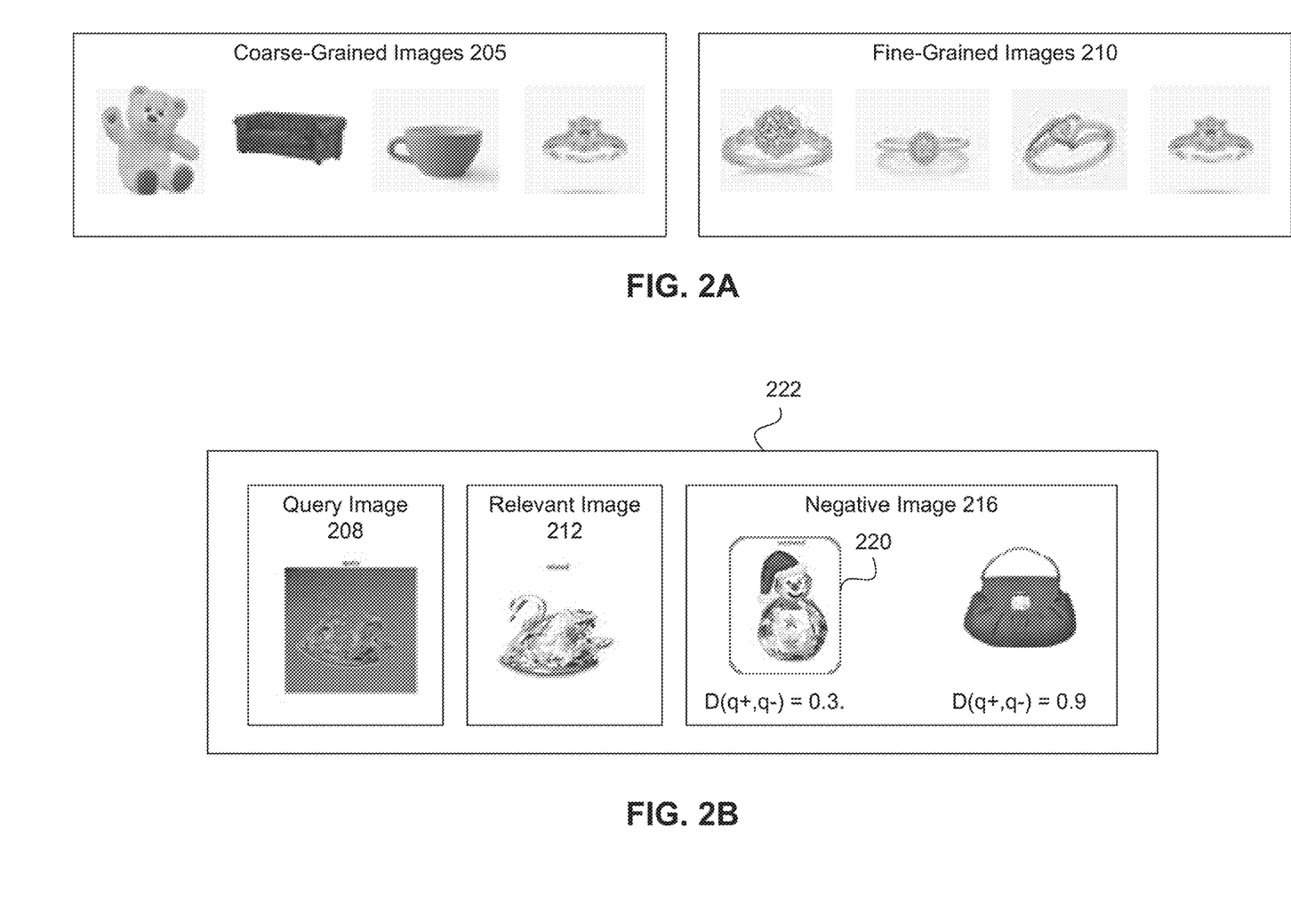
FIG. 2A illustrates examples of coarse-grained images and fine-grained images, according to some embodiments.
FIG. 2B illustrates an example for providing an image search training system, according to some embodiments.

FIG. 2A illustrates examples of coarse-grained images 205 and fine-grained images 210, according to some embodiments. As may be seen, the coarse-grained images may include different types of objects (e.g., a stuffed animal/teddy bear, couch, mug, and a diamond ring. The fine-grained images 210 may include different images of the same classification or type of object (e.g., different types of diamond rings).

In an embodiment, if a query image 108 is an emerald ring, and NIR 120 includes the selected illustrated coarse-grained images 205, ISTS 102 may select the diamond ring as the negative image 116 against which to train ISS 104.

FIG. 2B illustrates an example for providing an image search training system, according to some embodiments. In the example shown, a selection between two possible images from NIR 120, to be included in a triplet 122, is illustrated. For example, from a pool of candidate negative images of NIR 120, the image of a crystal snowman and a purse may be selected.

For each candidate, a distance metric D may be calculated between either q and q−, or q+ and q− is calculated. In the example illustrated, a distance D between the selected crystal swan q+ and the crystal snowman is calculated to be 0.3, while the distance between the crystal swan q+ and the purse is calculated to be 0.9.

In another embodiment, the distance metric D may be calculated between both query image 108 and a candidate negative image D(q, q−), and positive image 112 and a candidate negative image D(q, q+). Then, for example, based the various distance metrics, one of the candidate negative images may be selected as negative image 116. In various embodiments, negative image 116 may be selected based on calculating a (weighted or non-weighted) average of the distance metrics to get an average distance for different candidates. The various averages may then be compared to select negative image 116.

Or, for example, the candidate negative image with the shortest distance (either to q or q+) may be selected. If multiple images have the same distance, then the other distance may be used as a tie breaker. In an embodiment, the distance D(q) may be assigned priority over D(q+) as the primary distance, and D(q+) may be the tiebreaker distance, or vice versa. In other embodiments, other combinations of D(q) and D(q+) may be used to select negative image 116 from two or more candidate negative images.

As such, ISTS 102 may select the snowman with the smaller calculated distance as negative image 116 for triplet 122. This triplet 122 may then be provided to ISS 104. In an embodiment, the purse may be provided in a subsequent triplet 122. And once all or a subset of the initially selected negative images from NIR 120 are used in training, a new set of images (e.g., I1-I5 as illustrated in FIG. 1 may be selected from NIR 120). Selecting the object or image with smaller or smallest distance D may more quickly train the neural network of ISS 104 to be able to differentiate between similar, or finer-grained objects or images.

Figure 3:
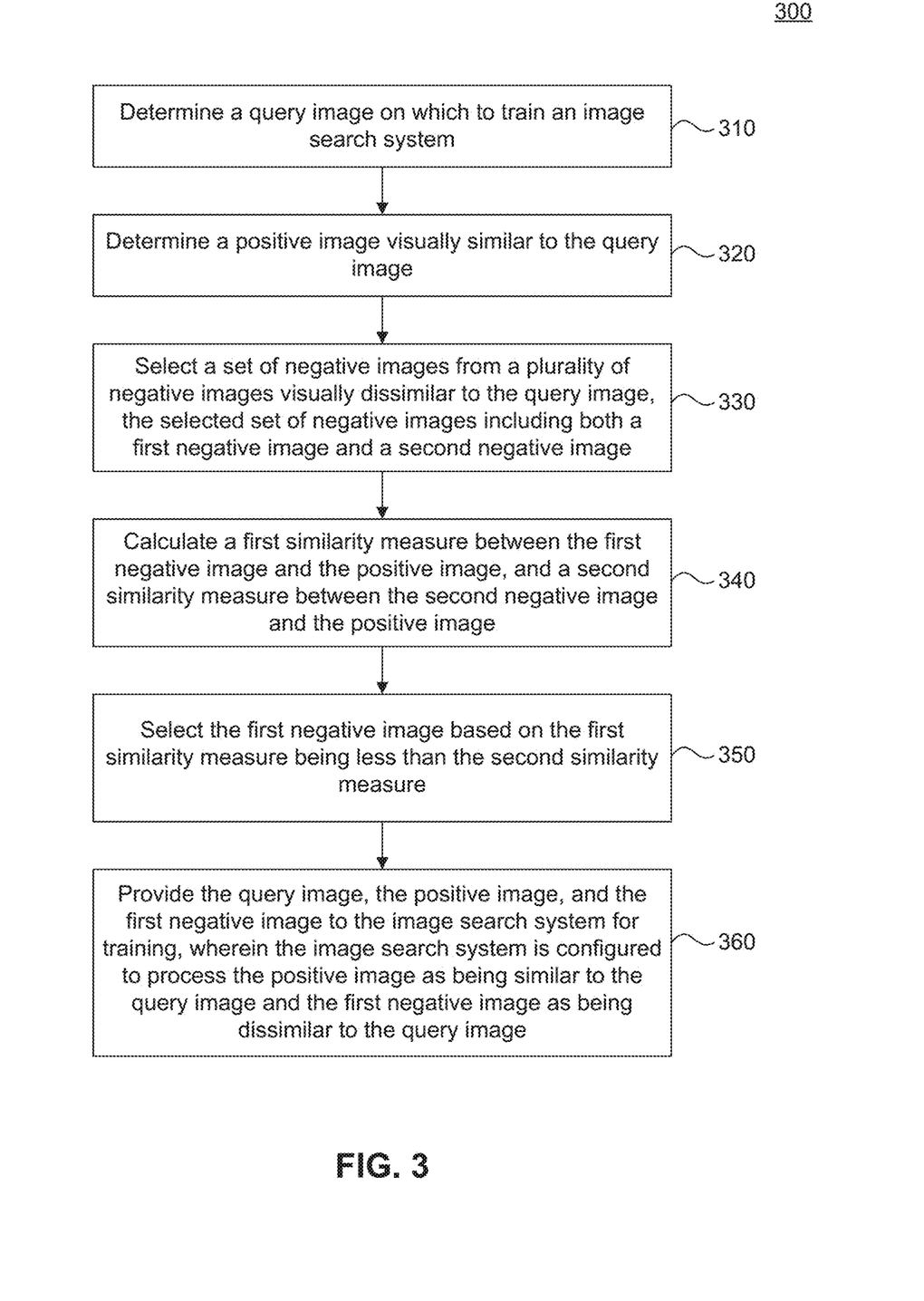
FIG. 3 is a flowchart illustrating example operations of a system for providing an image search training system, according to some embodiments.

FIG. 3 is a flowchart 300 illustrating example operations of a system for providing an image search training system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to the example embodiments.

In 310, a query image on which to train an image search system is determined. For example, a user may select query 108 from a catalogue of images on which ISS 104 is to be trained. In an embodiment, ISS 104 may be a specialized image search system that is trained to differentiate between different types of cars, motor vehicles, faces, jewelry, or any other product or object category.

In 320, a positive image visually similar to the query image is determined. For example, ISTS 102 may select or receive a selection of an image from a positive image repository 114. Positive image repository 114 may include a catalogue or index of one or more images that have been determined (by a user or other system) to be visually similar to query image 108. In an embodiment, the images of positive image repository 114 may be ranked according to visual similarity and the most visually similar image may be selected first. In another embodiment, ISTS 102 may randomly select images from positive image repository 114 to use in triplet 122.

In 330, a set of negative images from a plurality of negative images visually dissimilar to the query image is selected, where the selected set of negative images includes both a first negative image and a second negative image. For example, ISTS 102 may select a set of images (I1-I5) from NIR 120. In an embodiment, the selection of a first set of images may be performed randomly. The images of NIR 120 may have been previously grouped, classed, or categorized as being different from query image 108.

In 340, a first similarity measure between the first negative image and the positive image is calculated, and a second similarity measure between the second negative image and the positive image is calculated. For example, ISTS 102 may calculate a similar measure 124 between each of the selected images I1-I5 and the selected positive image 112. In other embodiments, different numbers of images from NIR 120 may be selected for which similar measures 124 may be computed.

In 350, the first negative image is selected based on the first similarity measure being less than the second similarity measure. For example, ISTS 102 may sort the images I1-I5 and select the image with the highest similarity measure 124. In an embodiment, the similarity measure 124 may be a distance measure as illustrated in FIG. 2B. For example, the distance between the crystal swan and crystal snowman may be 0.3 while the distance between the crystal swan and the purse may be 0.9. As such, the object or image with the smaller distance (i.e., greater similarity measure 124) may be selected as the negative image 116 for triplet.

In 360, the query image, the positive image, and the first negative image are provided to the image search system for training, wherein the image search system is configured to process the positive image as being similar to the query image, and the first negative image as being dissimilar to the query image. For example, ISTS 102 may assemble query image 108, positive image 112, and negative image 116 into triplet 122.

ISS 104 may be a neural network that is configured to apply machine learning to develop rules for identify or differentiate between different images in the form of triplets 122. In an embodiment, during training, ISS 104 may output a feature vector 126.

From feature vector 126, ISTS 102 may calculate distances between f and f+, and f and f−. The distances may range between 0-1. In an embodiment, values closer to 0 may correspond to the most similar features (or fewest visual differences) while values closer to 1 may correspond to the least similar features (or most visual differences). In an embodiment, based on these distances, ISTS 102 may determine whether to select or generate a new triplet 122 with which to train ISS 104.

For example, if the distance between f and f+ is 0.5 that may be too great a distance, and ISS 104 may be provided another triplet 122. If after several iterations the distances between f and f+ and f and f− stays the same or within a range, ISTS 102 may determine that training is complete and ISS 104 may be put into production mode.

During production mode, ISS 104 may use the trainings, to receive and process fine-grained image queries 106 and produce results 107. For example, ISS 104 may have access to a database of images, including those available through other networks or the internet, and may return result sets 107 of images that correspond to the image-based queries 106.

Figure 4:
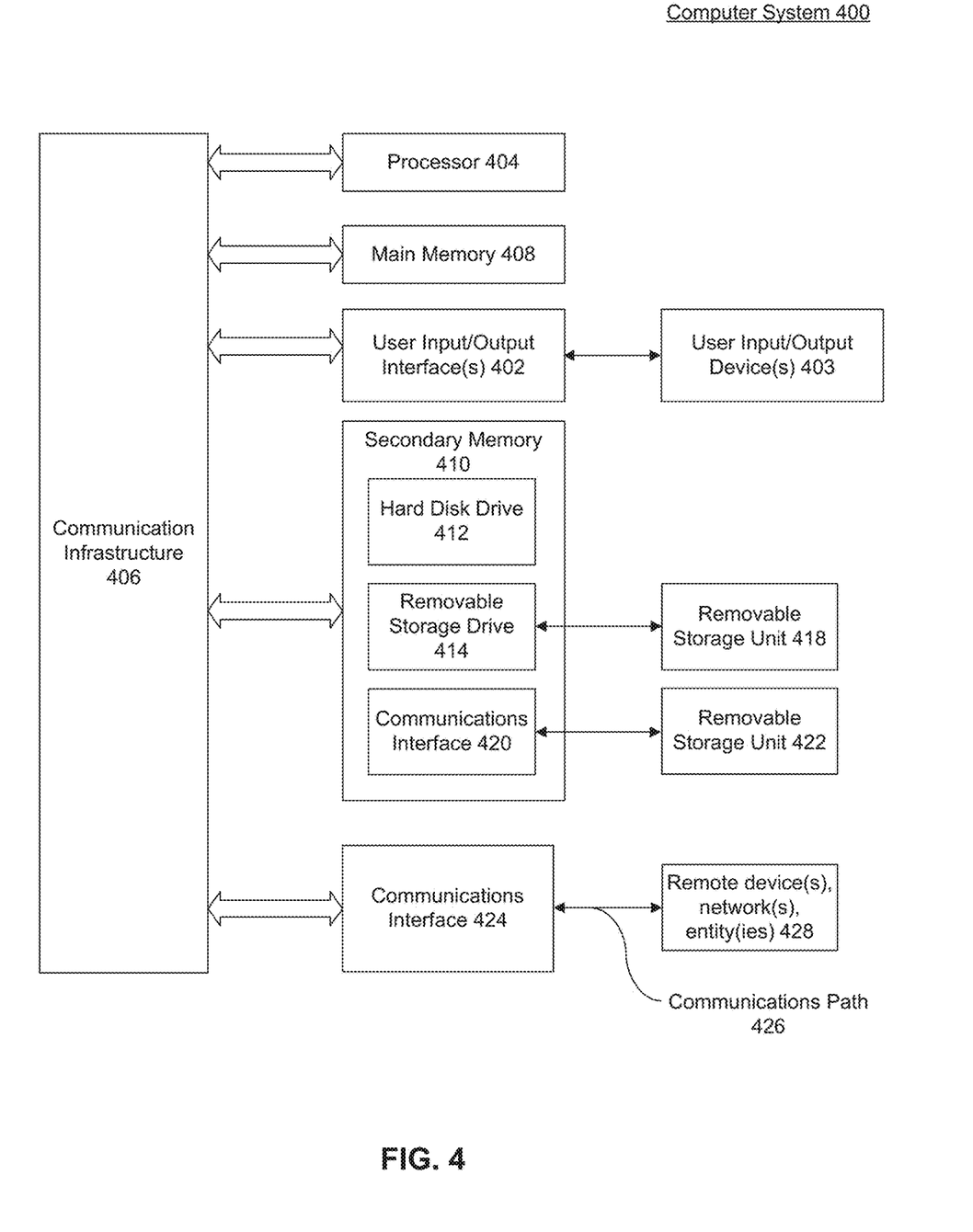
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
determining a query image on which to train an image search system;
determining a positive image visually similar to the query image;
selecting a set of negative images from a plurality of negative images visually dissimilar to the query image, the selected set of negative images including both a first negative image and a second negative image;
calculating a first similarity measure between the first negative image and the positive image, and a second similarity measure between the second negative image and the positive image;
selecting the first negative image based on the first similarity measure being less than the second similarity measure; and
providing the query image, the positive image, and the first negative image to the image search system for training, wherein the image search system is configured to process the positive image as being similar to the query image and the first negative image as being dissimilar to the query image.

2. The method of claim 1, wherein the image search system is a neural network configured to implement machine learning.

3. The method of claim 1, wherein the selecting the set of negative images comprises randomly selecting the set of negative images from the plurality of negative images before determining the first similarity measure.

4. The method of claim 1, further comprising:
determining a feature vector output from the image search system; and
determining, based on the feature vector, a first distance between the first negative image and the query image, and a second distance between the positive image and the query image.

5. The method of claim 4, further comprising:
computing a loss measure based on the first distance and the second distance; and
determining, based on the loss measure, whether to select a second set of negative images from the plurality of negative images.

6. The method of claim 5, further comprising:
determining a second positive image; and
providing the query image, the second positive image, and the second negative image to the image search system for training.

7. The method of claim 1, wherein the calculating excludes one or more of the plurality of negative images for which no similarity measure is calculated.

8. The method of claim 1, further comprising:
determining that a classification of the positive image corresponds to a classification of the query image; and
determining that a classification of the set of negative images does not correspond to the classification of the query image.

9. The method of claim 1, wherein the set of negative images are visually dissimilar to the query image relative to the visual similarity between the positive image and the query image.

10. A system comprising:
a memory; and
at least one processor coupled to the memory and configured to:
determine a query image on which to train an image search system;
determine a positive image visually similar to the query image;
select a set of negative images from a plurality of negative images visually dissimilar to the query image, the selected set of negative images including both a first negative image and a second negative image;
calculate a first similarity measure between the first negative image and the positive image, and a second similarity measure between the second negative image and the positive image;
select the first negative image based on the first similarity measure being less than the second similarity measure; and
provide the query image, the positive image, and the first negative image to the image search system for training, wherein the image search system is configured to process the positive image as being similar to the query image and the first negative image as being dissimilar to the query image.

11. The system of claim 10, wherein the image search system is a neural network configured to implement machine learning.

12. The system of claim 10, wherein the at least one processor that selects the set of negative images is configured to randomly select the set of negative images from the plurality of negative images before determining the first similarity measure.

13. The system of claim 10, wherein the at least one processor is further configured to:
determine a feature vector output from the image search system; and
determine, based on the feature vector, a first distance between the first negative image and the query image, and a second distance between the positive image and the query image.

14. The system of claim 13, wherein the at least one processor is further configured to:
compute a loss measure based on the first distance and the second distance; and
determine, based on the loss measure, whether to select a second set of negative images from the plurality of negative images.

15. The system of claim 14, wherein the at least one processor is further configured to:

determine a second positive image; and provide the query image, the second positive image, and the second negative image to the image search system for training.

16. The system of claim 10, wherein the at least one processor that calculates is configured to exclude one or more of the plurality of negative images for which no similarity measure is calculated.

17. The system of claim 10, wherein the at least one processor is further configured to:

determine that a classification of the positive image corresponds to a classification of the query image; and determine that a classification of the set of negative images does not correspond to the classification of the query image.

18. The system of claim 13, wherein the set of negative images are visually dissimilar to the query image relative to the visual similarity between the positive image and the query image.

19. A non-transitory computer-readable device having instructions stored thereon that, when executed by at least one computing device, cause the at least one computing device to perform operations comprising:

determining a query image on which to train an image search system;

determining a positive image visually similar to the query image;

selecting a set of negative images from a plurality of negative images visually dissimilar to the query image, the selected set of negative images including both a first negative image and a second negative image;

calculating a first similarity measure between the first negative image and the positive image, and a second similarity measure between the second negative image and the positive image;

selecting the first negative image based on the first similarity measure being less than the second similarity measure; and providing the query image, the positive image, and the first negative image to the image search system for training, wherein the image search system is configured to process the positive image as being similar to the query image and the first negative image as being dissimilar to the query image.

20. The device of claim 19, wherein the image search system is a neural network configured to implement machine learning.

* * * * *